United States Patent
Berlin et al.

[11] 3,891,633
[45] June 24, 1975

[54] METHOD OF PRODUCING DIANHYDRIDES OF AROMATIC TETRACARBOXYLIC ACIDS

[76] Inventors: Alfred Anisimovich Berlin, Leninsky prospekt, 57, kv. 9; Boris Izrailevich Liogonky, ulitsa 26 Bakinskikh Komissarov, 7, korpus 4, kv. 45; Boris Isaakovich Zapadinsky, prospekt Vernadskogo, II/19, kv. 221, all of Moscow, U.S.S.R.

[22] Filed: Sept. 17, 1973

[21] Appl. No.: 397,736

Related U.S. Application Data

[63] Continuation of Ser. No. 102,911, Dec. 30, 1970, abandoned.

[30] Foreign Application Priority Data

| Jan. 7, 1970 | U.S.S.R. | 1386176 |
|---|---|---|
| Jan. 7, 1970 | U.S.S.R. | 1386177 |
| Jan. 7, 1970 | U.S.S.R. | 1386178 |
| Jan. 7, 1970 | U.S.S.R. | 1386182 |
| Jan. 7, 1970 | U.S.S.R. | 1386186 |

[52] U.S. Cl. ...... 260/240 G; 260/2 EA; 260/30.4 R; 260/57 R; 260/78 R; 260/340.7
[51] Int. Cl. .............................. C07c 63/18
[58] Field of Search............. 260/346.3; 260/346.6; C07c/63/18; 260/240 G, 346.3, 340.7

[56] References Cited
UNITED STATES PATENTS

| 3,179,630 | 4/1965 | Endrey et al. | 260/78 TF |
|---|---|---|---|
| 3,562,189 | 2/1971 | Farrissey et al. | 260/78 TF |

FOREIGN PATENTS OR APPLICATIONS

| 1,556,159 | 12/1968 | France | 260/346.3 |

OTHER PUBLICATIONS

Dunlop et al., The Furans, page 59, Reinhold Pub. Corp., 1953.
Berlin et al., Chemical Abstracts, Vol. 69, Abst. No. 28013, e, (1968).
Shelkunov et al., Chemical Abstracts, Vol. 72, Abst. 67586, a, (4–6–70), (original article dated 1969).
Rudakov et al., Dokl. Akad. Nauk SSSR, Vol. 161, pp 617 to 619, (1965).
Rudakov et al., Chemical Abstracts, Vol. 63, Col. 740, (1965), (abstracts Rudakov in English).

*Primary Examiner*—John D. Randolph
*Attorney, Agent, or Firm*—Holman & Stern

[57] ABSTRACT

A method of producing dianhydrides of aromatic tetracarboxylic acids, characterized by the general formula

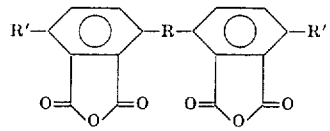

where R stands for
a. arylene;
b. a group-CH—N—R''—N=CH—, where R'' is arylene or
c. a group

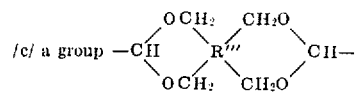

where R''' is

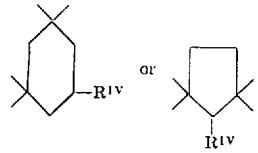

where R'', H, OH or = O is
d. is a group —CH$_2$—OCO—R$^r$—COOCH$_2$—
where R$^r$ is arylene
e. R is absent;
R' is hydrogen, phenyl, naphthyl, or the method residing in that the bis-adducts obtained by the Diols-Alder reaction between maleic anhydride and bis-furanic compounds of the general formula

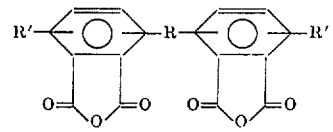

where
R and R' have the above-said values, are dehydrated by means of acidic reagents: gaseous hydrogen chloride or hydrogen bromide, concentrated hydrochloric, hydrobromic and sulphuric acids or polyphosphoric acid. The proposed dianhydrides are used for producing polyimides and polyimidazopyrrolones as well as for curing epoxy resins.

14 Claims, No Drawings

METHOD OF PRODUCING DIANHYDRIDES OF AROMATIC TETRACARBOXYLIC ACIDS

This is a continuation of application Ser. No. 102,911, filed Dec. 30, 1970, now abandoned.

The present invention relates primarily to methods of producing dianhydrides of aromatic tetracarboxylic acids.

This class of organic compounds has attracted particular interest because these dianhydrides have found a wide use as initial monomers for synthesis of heterocyclic polymers such as polyimides and polyimidazopyrrolones. The polymers of these types have an outstanding thermal stability which is combined with excellent physico-chemical and mechanical properties.

An object of the present invention is to provide a novel class or dianhydrides of aromatic acids.

Another object of the invention is a synthesis of dianhydrides of aromatic tetracarboxylic acids capable of serving as monomers for producing thermostable polymers.

Still another object of the invention is to provide a method of synthesis of dianhydrides of aromatic tetracarboxylic acids allowing the structure of the products to be changed without any significant changes in the process of their production.

Other objects and advantages of the invention will be apparent from the following detailed description of the invention.

According to the present invention, the above-mentioned objects are attained by providing a novel class of dianhydrides of aromatic tetracarboxylic acids, characterized by the general formula

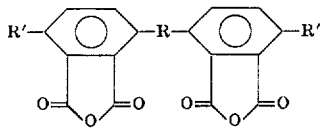

where R is a. arylene selected from the group consisting of p-phenylene, m-phenylene, 4,4'-diphenylene, 3,3'-dimethyl-4,4'-diphenylene, 4,4'-diphenylenoxide, 4,4'-diphenylenemethane, 4,4'-diphenylenesulphone;

b. group - CH=N—R''—N=CH—, where R'' is arylene selected from the group consisting of p-phenylene, m-phenylene, 4,4'-diphenylene, 3,3'-diphenylene, 3,3'-dimethyl-4,4'-diphenylene, 3,3'-dimethoxy-4,4'-diphenylene, 4,4'-diphenyloxide, 4,4'-diphenylenemethane, 4,4'-diphenylenesulphone, 4,4'-diphenylenesulphide, 1,4-napthtylene, 2,6-naphthylene, 2,7-naphthylene, 1,4-anthrylene;

c. group

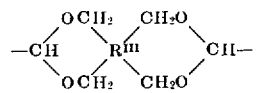

where $R^{111}$ is selected from the group consisting of

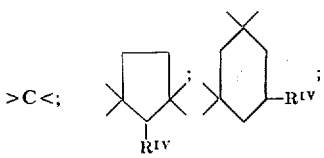

$R^{1V}$ is selected from the group consisting of H, OH, =O, d. group —CH$_2$OCO—R$^r$—COOCH$_2$—, where R$^r$ is selected from the group consisting of p-phenylene, m-phenylene, 4,4'-di-phenylane, 1,4-naphthylene, 1,5-naphthylene, 2,6-naphthylene, 2,7-naphthylene;

e. R is absent;

R' is selected from the group consisting of hydrogen, phenyl, naphthyl.

From the point of view of useful properties of polymers produced on the basis of the above-stated dianhydrides, the most interesting are the following dianhydrides:

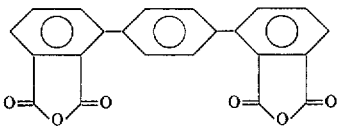

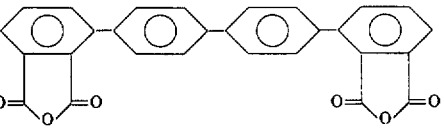

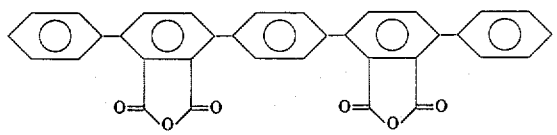

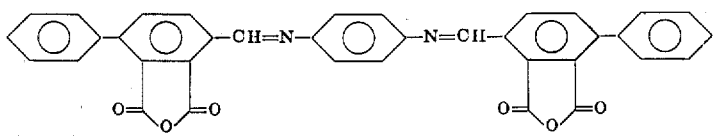

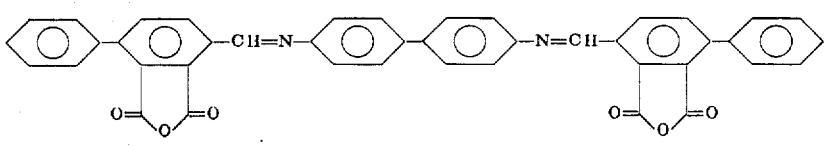

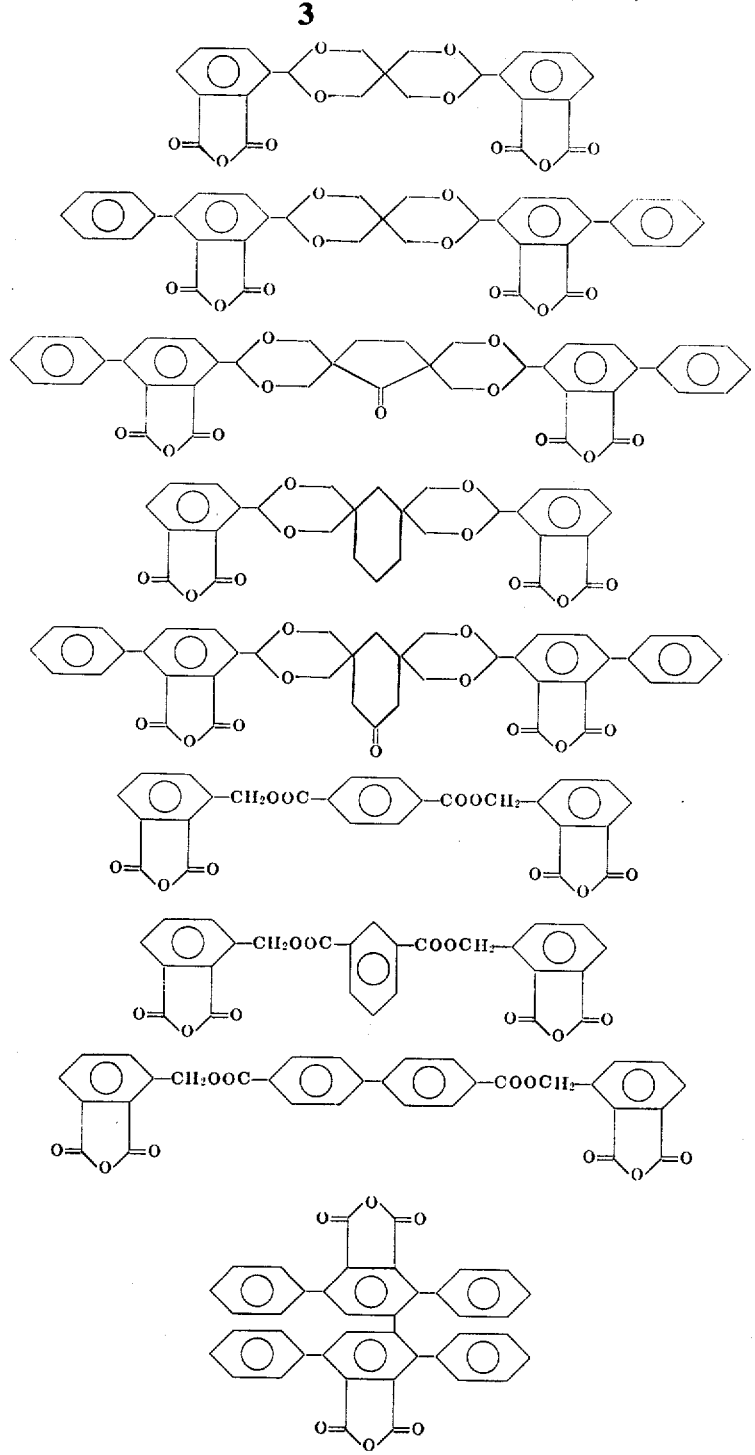

The synthesis of the said dianhydrides of aromatic tetracarboxylic acids provides for dehydration of the bis-adducts obtained by the Diels-Alder reaction between maleic anhydride and bis-furanic compounds, characterized by the general formula

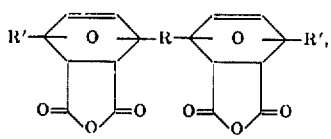

where R is
a. arylene selected from the group consisting of p-phenylene, m-phenylene, 4,4'-diphenylene, 3,3'-dimethyl-4,4'-diphenylene, 4,4'-diphenylenoxide, 4,4'-diphenylmethane 4,4'-diphenylsulphone;

b. group —CH=N—R''—N=CH — where R'' is arylene selected from the group consisting of p-phenylene, m-phenylene, 4,4'-diphenylene, 3,3'-diphenylene, 3,3'-dimethyl- 4,4'-diphenylene, 3,3'-dimethoxy-4,4'-diphenylene, 4,4'-diphenylenoxide, 4,4'-diphenylenemethane, 4,4'-diphenylenesulphone, 4,4'-diphenylenesulphide, 1,4-naphthylene, 1,5-naphthylene, 2,6-naphthylene, 2,7-naphthylene, 1,4-antrylene;

c. group

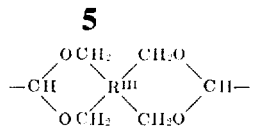

where $R^{III}$ is selected from the group consisting of

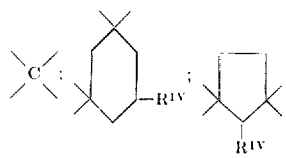

where $R^{IV}$ is selected from the group consisting of H, OH, =O;

d. group $- CH_2OCO-R^r-COOCH_2 -$, where $R^r$ is selected from the group consisting of p-phenylene, m-phenylene, 4,4′-diphenylene, 1,4-naphthylene, 1,5-naphthylene, 2,6-naphthylene, 2,7-naphthylene;

e. R is absent;

R′ is a substitute selected from the group consisting of hydrogen, phenyl, naphthyl.

Dehydration is effected under the action of acidic reagents, such as gaseous hydrogen chloride and hydrogen bromide, concentrated hydrochloric, hydrobromic and sulphuric acids, polyphosphoric acid at a temperature of −30° to + 110°C during at least 30 minutes in a solvent medium such as glacial acetic acid, concentrated sulphuric acid, polyphosphoric acid.

The selection of the reaction conditions is determined by the acidic reagent used.

When using gaseous reagents, hydrogen chloride or hydrogen bromide is bubbled through a solution of the above- said bisadduct in glacial acetic heated to 80°–100°C during at least one hour.

This method is used for obtaining the best yield by using hydrogen bromide free from bromine at a boiling point of the glacial acetic acid during at least 4 to 8 hours.

Dehydration by concentrated hydrochloric, hydrobromic and sulphuric acids is effected by adding the above-said acids to a solution of the bis-adduct in glacial acetic acid while heating the mixture at a temperature of 20°–80°C during at least one hour, the acidic agent being used in quantities not exceeding 0.5 mmole per litre of the reaction solution.

This method gives the best results when using concentrated sulphuric acid at a temperature of 20°–30°C during 10–12 hours, in which case 4–6 ml of sulphuric acid is required per litre of glacial acetic acid.

When using concentrated sulphuric acid and polyphosphoric acid, the acidic reagents serve simultaneously as solvents of the reaction.

Thus, the initial bis-adduct is added to concentrated sulphuric acid, cooled down to a temperature of −30° to + 10°C, and the reaction mixture is kept at this temperature during at least 30 minutes. The concentration of the bis-adduct in sulphuric acid must not exceed 10% by weight.

In polyphosphoric acid the initial bis-adduct is dehydrated at a temperature of 10°–50°C during at least 10 hours, the concentration of the bis-adduct in polyphosphoric acid being not in excees of 30% by weight.

By using the last two methods, the dehydration of the bis-adducts is attained at a concentration of the initial bis-adduct in the above-said acidic reagents not exceeding 3-5% by weight at a temperature within the range of −10° to 0°C, when using sulphuric acid, and of 20°–30°C when using polyphosphoric acid.

When using the best versions of the above methods, the yield of dianhydrides of aromatic tetracarboxylic acids reaches 50–85%.

It should be noted that the obtained rather high yields of the proposed dianhydrides by means of dehydration of the bis-adducts containing acetal or ester bonds or groups of Schiff's bases in an acidic medium is unexpected, because it is well known that these structures are very sensitive to acidic agents.

All the initial bis-adducts of the above class were first obtained in our experiments. The method of their synthesis envisages the Diels-Alder reaction between at least two equivalents of maleic anhydride and one equivalent of a bisfuranic compound at temperatures of 0° to 100°C during at least 1 hour in a medium of benzene, acetone, acetylacetone, tetrahydrofurane, cyclobexane, or ethylacetate.

The best yields (70–90%) of the bis-adducts are attained when using three equivalents of maleic anhydride per equivalent of a bis-furanic compound at a temperature of 20° to 60°C during at least 4 hours in a medium of tertahydrofuran.

The reaction of forming the above-said bis-adducts is illustrated by the following diagram

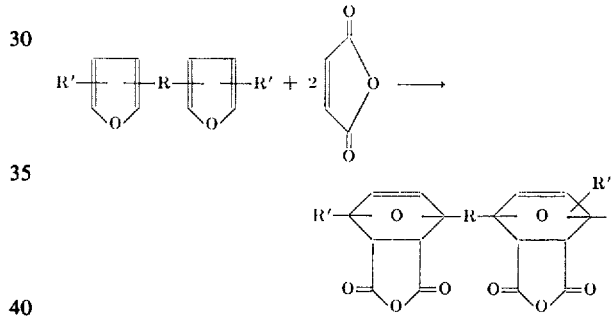

According to the proposed invention, the initial bis-adducts are composed of products of the Diels-Alder reaction between maleic anhydride and the following bis-furanic compounds: Bis-(5-R′-2-furyl)-arylenes, N,N′-bis-(5-R-furfurylidene)-diaminoarylenes, N,N′-bis-(5-R-furfurylidene-diaminoarylenes, 2,2′,5,5′-tetraphenyl - β -difuryl, bis-furfuryl esters of aromatic dicarboxylic acids such as terephthalic, isophthalic, acid, 4,4′-diphenyldicarboxylic acid, 1,4- 1,5-, 2,6 and 2,7-naphthalenedicarboxylic compounds comprising spiranic groups: 3,9-bis(5-R′-2-furyl(-2,4,8,10-tetraoxaspiro (5,5) undecanes, 3,11-bis-(5 R′-2-furyl(-15-R-2,4,10,12-tetraoxadispiro (5,1,5,3) -hexadecanes, 3,11-bis-(5-R′-2-furyl(-7-R-2,4,10,12-tetraoxadispiro (5,1,5,2) pendadecanes, where R′ is hydrogen, phenyl, naphthyl; R=H, OH, =O.

Most of the bis-furanic compounds which are employed have been produced by us for the first time.

Bis-(5-R′-2-furyl)-arylenes have been produced by decomposing aromatic bis-diazocompounds by the Gomberg-Bachman method in a medium of 5-R′-furan, where R′ is hydrogen, phenyl, naphthyl.

N,N′-bis-(5-R′-furfurylidene)-diaminoarylenes are products of condensation of respective aromatic diamines with 5-R′-furfural, where R′ is hydrogen, phenyl, naphthyl.

The corresponding bis-furfuryl esters have been produced by means of transesterification of methyl or ethyl esters of aromatic dicorboxylic acids with furfuryl alcohol. The bis-furanic compounds containing spiranic groups have been produced by reacting pentaerythritol or respective derivatives tetramethylolcyclohexane or tetramethylolcyclopentane with 5-R'-furfural, where R' is hydrogen, phenyl, naphthyl, in the presence of anhydrous zinc chloride.

The dianhydrides of aromatic tetracarboxylic acids proposed in the present invention are mostly used as monomers for the synthesis of heterocyclic thermostable polymers relating to classes of polyimides and polyimidazopyrrolones. The formation of these polymers provides for interaction of these aromatic dianhydrides with aromatic diamines for producing polyimides and with ortho- or peri, peri-tetramines for producing polyimidazopyrrolones. The polymers produced on the basis of the proposed dianhydrides have high thermal, thermo-oxidizing and ablation resistance. Thus, the temperature of the commencement of weight loss in these polymers in the presence of oxygen is within the range of 380°–560°C depending on the structure of the initial dianhydride.

The use of dianhydrides comprising phenyl or naphthyl substitutes in the nucleus carrying an anhydride group as well as of dianhydrides containing spiranic or ester groups allowed us to produce polyimides and polyimidazolpyrrolones soluble in cresoles, phenols, and pyridines while maintaining a high thermal resistance. This property is a new feature of these types of polymers.

The proposed dianhydrides are also used as curing agents for increasing the thermal stability of epoxy and novolac phenolformaldehyde resins. The use of these dianhydrides makes it possible to increase the operating temperature of articles made of epoxy resins for 50°–80°C as compared to the articles produced from the resins cured with the help of phthalic or maleic anhydride.

The above examples of application of the proposed anhydrides do not cover the entire field of their possible application. They can also be used for synthesis of carboxyl-containing polyesters, while, when transformed into tetra-esters, they serve as plasticizers of some types of polymers.

The present invention will be better understood by those skilled in the art from the following examples of some particular embodiments of the invention and characteristics of the obtained products.

Given in Examples 1–17 is a description of the synthesis of a number of first obtained bis-furanic compounds; Examples 18–36 deal with the systhesis of bis-adducts of the Diels-Alder reaction between maleic anhydride and bis-furanic compounds; Examples 37–59 describe the synthesis of dianhydrides of aromatic tetracarboxylic acids.

EXAMPLE 1

To a solution of 0.025 mmole (6.42 g) of benzidine hydrochloride in 100 ml of water and 15 ml of 35% hydrochloric acid cooled down to 0°C by 25 g of ice is added drowise a 35% solution of 0.05 mole (3.55 g) of sodium nitrite. The filtered and cooled solution of diazosalt is gradually added to a well stirred emulsion of 200 ml of freshly distilled furan and 3 g of 5N aqueous solution of NaOH. After stirring the mixture during 24 hours (in addition to the first 5 hours at 33°C), the organic layer was separated, the precipitate was extracted by furan (3 × 25 ml) and the solvent was removed from the combined furanic fractions. By means of chromotography over neutral aluminium oxide (column 10 × 200 mm) in benzene there was obtained 7.2% (0.51 g) of 4,4'-bis-($\alpha$-furyl)-diphenyl with a melting point of 104°–106°C.

Found in per cent: C, 83.2; H, 5.12.
Calculated for $C_{20}H_{14}O_2$: C, 83.9; H, 4.89.

EXAMPLE 2

Added dropwise to a solution of 0.05 mole (12.85 g) of benzidine hydrochloride in 200 ml of water and 30 ml of 35% hydrochloric acid cooled down to 0°C by 100 g of ice was 0.1 mole (7.1 g) of sodium nitrate. Added to the diazosolution was 0.05 male (14.5 g) of fine-ground 2,5-naphthalene-disulphonic acid, the produced precipitate was filtered out and was dried in a vacuum-desiccator above potassium chloride. Added dropwise to a suspension of diazonium salt in 200 ml of freshly distilled furan was 10.5 g of sodium acetate in 2.25 g of acetic anhydride. After boiling the mixture during 48–56 hours with a reflux condenser, the organic layer was isolated, the precipitate was extracted with furan 3 × 25 ml and then, by using the technique described in Example 1, 12.6% (1.7 g) of 4,4'-bis-($\alpha$-furyl) -diphenyl was obtained.

EXAMPLE 3.

0.05 mole of p-phenylenediamine hydrochloride was diazotized and decomposed in an excess of furan similarly to Example 1 and 10.5% (1.1 g) of 1.4-bis-($\alpha$-furyl)-benzene was obtained having a melting point 67°–69°C.

Found, per cent: C, 79.3; H, 4.71.
Calculated for $C_{14}H_{10}O_2$ : c, 80.0; H, 4.76.

EXAMPLE 4

0.1 mole of p-phenylenediamine hydrochloride was diazotized and decomposed in an excess of furan according to Example 2 and 14.6% (3.06 g) of 1,4-bis-($\alpha$-furyl)-benzene was produced.

EXAMPLE 5

0.1 mole (27.1 g) of 4,4'-diaminodiphenylmethane hydrochloride was diazotized and decomposed in an excesss of 2-phenylfuran by the method of Example 1 (the only difference consisting in that the diazonium salts during the last two hours of the reaction were decomposed at 60°C. 16% (7.3 g) of 4,4'-bis(phenyl-2-furyl)-diphenylmethane was obtained having a melting point of 132°–134°C.

Found, per cent: C, 88.8; H, 5.68.
Calculated for $C_{33}H_{24}O_2$: C, 89.5; H, 5.43.

EXAMPLE 6

0.1 mole (26.7 g) of benzidine hydrochloride was diazotized and through a stabilized bis-diazonium salt was decomposed in an excess of 2-naphthylfuran ( during the last 2 hours the reaction of decomposition of the diazonium was conducted at a temperature of 80°–95°C). 15%, (3.07 g) of 4,4'-bis(naphthyl-2-furyl) diphenyl was produced having a melting point of 119°–122°C.

Found, per cent: C, 88.6; H, 4.42.
Calculated for $C_{40}H_{26}O_2$: C, 89.1; H, 4.83.

EXAMPLE 7

A solution of 0.05 mole (12.84 g) of benzidene hydrochloride in 170 ml of glacial acetic acid was diazontized in 0.1 mole (12.1 g) of amylnitrite at 10°C. the diazosalt was precipitated with ether and was decomposed with an intense stirring in 750 ml of freshly-distilled 2-phenylfuran while simultaneously adding a soltion of 7 grams of anhydrous sodium acetate in 30 ml of acetic anhydride. The temperature was slowly increased to 33°C. After the end of evolution of hitrogen (approximately 6–8 hours), the excess of 2-phenylfuran was distilled off in a vacuum, the precipitate was disolved in benzine and 19.1% of 4,4'-bis(5-phenyl-2-furyl) diphenyl was obtained by chromotography over neutral aluminium oxide.

EXAMPLE 8

0.3 mole (28.8 g) of furfural and 0.1 mole (20.4 g) of 1,1,3,3-tetramethylolcyclopentanon-2 was mixed with 0.7 g of anhydrous zinc chloride during 3 to 4 hours at a boiling point of furfural. When cooled, the reaction mass solidifies. After crushing and recrystallization from acetone, 58% of β,11-bis(2-furyl)-2,4,10,12-tetraoxadispire (5,1,5,2) pentadecanone-7was produced having a melting point of 184°–187°C.
Found, per cent: C, 63.0; H, 5.58.
Calculated for $C_{19}H_{20}O_7$: C, 63.5; H, 5.56

EXAMPLE 9

By using the method described in Example 8, 67% of 3,11-bis-(2-furyl)-2,4,10,11-tetraoxadispiro (5,1,5,3)-hexadecanone-15 was obtained from 0.1 mole of furfural, 0.03 mole of 1,1,3,3-tetramethylcyclohexanone-5 and 0.5 g of zinc chloride, the product having a melting point of 213°–214°C.
Found in per cent: C, 62.2; H, 5.88.
Calculated for $C_{20}H_{22}O_7$: C, 64.3; H, 5,54.

EXAMPLE 10

0.1 mole (17.5 g) of 5-phenylfurfural and 0.03 mole (4.45 g) of pentaerythritol was mixed with 0.5 g of anhydrous zinc chloride during 4 hours at a temperature of 135°C. The precipitate was filtered off and after recrystallization from acetone 74% (9.8 g) of 3,9-bis-(5-phenyl-2-furyl)-2,4,8,10-tetraoxaspiro (5,5) undecane was produced having a melting point of 182°–183°C.
Found, per cent: C, 73.15; H, 5.4.
Calculated for $C_{27}H_{24}O_6$: C, 73.0; H, 5.4.

EXAMPLE 11

0.1 mole (17.5 g) of 5-phenylfurfural and 0.03 mole (6,12,1,1,3,3-tetramethylolcyclohexane was treated by the method of Example 10 to produce 70% (11 g) of 3,11-bis(5-phenyl-2-furyl)-2,4,10,12-tetraoxadispire (5,1,5,3) hexadecane having a melting point of 201°–202°C.
Found, in per cent: C, 73.2; H, 6.24.
Calculated for $C_{32}H_{32}O_6$: C, 73.5; H, 6;13

EXAMPLE 12

0.1 mole (22.2g) of 5-naphthylfurfural and 0.03 mole (6.6 g) of 1,1,3,3-tetramethylolcyclohexanole-5 was treated by the method of Example 10 to produce 64% (12.0 g) of 3,11-bis(5-naphthyl-2-furyl)-15-oxy-2,4,10,12-tetraoxadispire (5,1,5,3 hexadecane with a melting point of 246°–247°C.
Found, per cent: C, 76.2; H, 5.4.
Calculated for $C_{40}H_{36}O_7$: C, 76.4; H, 5,73.

EXAMPLE 13

0.1 mole (17.5 g) of 5-phenylfurfural and 0.03 mole (6.55 g) of 1,1,3,3-tetramethylolcyclohexanene-5 was treated by the method described in Example 10, thus producing 79% (12.5 g) of 3,11-bis(5-phenyl-2-furyl)-2,4,10,12-tetraoxadispire (5,1,5,3) hexadecanone-15 with a melting point of 214°–215°C.
Found, per cent: C, 73.0; H, 5.74.
Calculated for $C_{32}H_{30}O_7$: C, 73.0; H, 5.69.

EXAMPLE 14

0.1 mole (10.8 g) of free base of p-phenylenendiamine was mixed with 0.3 mole (51.6 g) of 5-phenylfurfural and the reaction vessel was immediately vacuumised. During the exothermic reaction at 40°C (7–9 mm Hg) the main amount of water is distilled off. Then the reaction mixture is heated and after 1–2 hours at 40°–60°C the reaction is completed. The obtained product was twice extracted by boiling either for removing the unreacted initial products. The recrystallization from cyclohexane in an inert atmosphere gives 61% (25.5 g) of N,N'-bis-(5-phenylfurfurylidene)- p-phenylenediamine with a melting point of 108°–109°C.
Found, per cent: C, 80.6; H, 4.73; N, 6.91.
Calculated for $C_{28}H_{20}N_2O_2$: C, 80.7; H, 4,81; N, 6.73.

EXAMPLE 15

By using the method given in Example 14, from 0.1 mole (18.4 g) of free base of benzidine and 0.3 mole (51.6 g) of 5-phenylfurfural after the recrystallization from benzene in an argon atmosphere followed by the filtering of the solution through a layer of aluminium oxide there was produced 72% (35.4 g) of N,N'-bis-(5-phenylfurfurylidene-benzidine having a melting point of 146°–149°C.
Found, per cent: C, 83.0; H, 4.74; N, 5.63.
Calculated for $C_{34}H_{24}N_2O_2$: C, 83.0; H, 4.88; N, 5.7.

EXAMPLE 16

By using the method of Example 14, produced from 0.05 mole (10 g) of 4,4'-diaminodiphenyl ester and 0.15 mole (25.8 g) of 5-phenylfurfural was 42% (10.65 g) of N,N¹-bis-(5-phenylfurfurylidene)-4,4'-diaminodiphenyleneoxide having a melting point of 104°–106°C.
Found, per cent: C, 81.2; H, 4,68; N, 5.47.
Calculated for $C_{34}H_{24}N_2O_3$: C, 80.4; H, 4.73; N, 5.52.

EXAMPLE 17

By using the method described in Example 14, produced from 0.05 mole (9.8 g) of 4,4'-diaminodiphenylmethane and 0.15 mole (33.5 g) of 5-naphthylfurfural was 54% (15 g) of N,N'-bis-(5-naphthylfurfurylidene-4,4'-diaminodiphenylmethane having a melting point of 116°–118°C.
Found, per cent: C, 84.2; H, 5.17; N, 5.06.
Calculated for $C_{39}H_{28}N_2O_2$: C, 84; H, 5.03; N, 5.03.

EXAMPLE 18

2.5 mmole (0.525 g) 1,4-bis-(α-furyl)-benzene and 10 mmole (0.98 g) maleic anhydride in 10 ml of tetrahydrofuran was heated during 8 hours at a temperature of 40°-60°C. The reaction mixture was poured into an excess of ether, the precipitate was filtered out, was dried in a vacuum at 20°C and was recrystallized from warm (40°-60°C) acetonitrile. 73% (0.55 g) of 1,4-di-(2,3-decarboxy-1,4-oxo-5-cyclohexenyl)-benzene-2,3-dianhydride was produced having a decomposition temperaure of approximately 100°C and an acid number of 530 (calculated 552).

Found, per cent: C, 64.3; H, 3,72.
Calculated for $C_{22}H_{14}O_8$: C, 65.0; H, 3.44

EXAMPLE 19

The product obtained from the organic phase of the reaction mixture of decomposition of phenylene-bis-diazonium hydrochloride (from 0.025 mole of p-phenylenediamine) in furan was treated with a solution of 2 grams of maleic anhydride and 15 ml of tetrahydrofuran. After 12 hours of heating at 40°-60°C the reaction mixture was poured into an excess of ether, the precipitate was filtered out, dried in a vacuum at 20°C and recrystallized from warm (40°-60°C) acetonitrile. There was produced 0.47 g of 1,4-di-(2,3-dicarboxy-1,4-oxo-5-cyclohexenyl)-benzene-2,3-dianhydride.

EXAMPLE 20

2 mmole (0.572 g) of 4,4'-bis($\alpha$-furyl)-diphenyl and 8 mmole (C.784. g) of maleic anhydride was reacted as in Example 18. 77% (0.74 g) of 4,4'-bis-(2,3-dicarboxy-1,4-oxo-5-cyclohexenyl)-diphenyl-2,3-dianhydride was produced having a decomposition point of approximately 100°C. The acid number: found, 431; calculated, 465.

Found, per cent C, 69.2; H, 3.86.
Calculated for $C_{28}H_{18}O_8$: C, 69.7; H, 3.74.

EXAMPLE 21

The product obtained from an organic base of the reaction mixture of decomposition of diphenyl-4,4'-bis-diazonium hydrochloride (from 0.025 mole of benzidine) was treated by maleic anhydride by the method given in Example 19, and 0.64 g of 4,4'-bis-(2,3-dicarboxy-1,4-oxo-5-cyclohexenyl)-diphenyl-2,3-dianhydride was obtained.

EXAMPLE 22

0.01 mole (3.26 g) of bis-furfuryl terephthalate and 0.03 mole (2.96 g) of maleic anhydride was heated in 150 ml of tetrahydrofuran during 6 hours at a temperature of 80°C. The solvent was removed in a vacuum and after the recrystallization from warn (40°-60°C) tetrahydrofuran there was produced di-(2,3-dicarboxy-1,4-oxo-5-cyclohexenyl terephthalate-2,3-dianhydride, the yield being 67%, (3.34 g) and the decomposition point of approximately 85°C. The acid number is 432 (calcualted, 429).

Found, per cent: C, 59.6; H, 3.58.
Calculated for $C_{26}H_{18}O_{12}$: C, 59.8; H, 3.45

EXAMPLE 23

0.01 mole (3.26 g) of bis-furfural isophthalate and 0.03 mole (2.96 g) of maleic anhydride was treated by the method of Example 22, thus producing 54% (2.82 g) of di-(2,3-dicarboxy-1,4-oxo-5-cyclohexenyl isophthalate-2,3-dianhydride. The decomposition point is approximately 80°C, the acid number 426 (429).

Found, per cent: C, 59.8; H, 3.68.
Calculated for $C_{26}H_{18}O_{12}$: C, 59.8; 3.45.

EXAMPLE 24

By using the method of Example 22, produced from 0.01 mole (4.02 g) of bis-furfuryl 4,4'-diphenylcarboxylate and 0.03 mole 2.96 g) of maleic anhydride is 69% of di-(2,3-dicarboxy-1,4-oxo-5-cyclohexenyl-4,4,'-diphenyldicarboxylate)-2,3-dianhydride. The decomposition point of the product is approximately 75°C, the acid number is 370 (375).

Found, per cent: C, 63.9; H, 3.74.
Calculated for $C_{32}H_{22}O_{12}$: C, 64.2; H, 3.68.

EXAMPLE 25

By using the method described in Example 22, from 0.01 mole (3.76 g) of bis-furfuryl 1,5-naphthalenecarboxylate and 0.03 mole (2.96 g) of maleic anhydride, there was produced 72% of di-(2,3-dicarboxy-1,4-oxo-5-cyclohexenyl 1,5-naphthalenedicarboxylate-2,3-dianhydride having a decomposition point of approximately 85°C.

Found, per cent: C, 62.5; H, 3.31.
Calculated for $C_{30}H_{20}O_{12}$: C, 62.9; H, 3.49

EXAMPLE 26

0.01 mole (2.92 g) of 3,9-bis-($\alpha$-furyl)-2,4,8.10-tetraoxaspiro-(5,5)-undecane was dissolved in 75 ml of tetrahydrofuran, then 0.04 mole (3.82 g) of maleic anhydride was added to the reaction mixture. After 72 hours the solution was precipitated into an excess of ether and after filtering out the reaction means there was produced 68% (4.5 g) of 3,9-bis-(2,3-dicarboxy-1,4-oxo-5-cyclohexenyl)-2,4,8,10-tetraoxaspiro (5,5) undecane-2,3-dianhydride with a decomposition point of approximately 85°C. The acid number: found, 462; calculated, 460.

Found, per cent: C, 56.4; H, 4.15.
Calculated for $C_{23}H_{20}O_{12}$: C, 56.6; H, 4.10.

EXAMPLE 27

3 mmole (0.875 g) of 3,9-bis-($\alpha$-furyl)-2,4,8,10-tetraoxaspiro (5,5) undecane and 6 mmole (0.568 g) of maleic anhydride in 50 ml of ether was kept during 7 days at a temperature of 20°C, the precipitate was filtered out, dried in open air and recrystallized from warm methanol. The yield was 74% (1.06 g) of 2,3-dianhydride of 3,9-bis-(2,3-dicarboxy-1,4-oxo-5-cyclohexanyl(-2,4,8,10-tetraoxaspiro (5,5) undecane. The acid number: found, 460; calculated, 460.

Found, per cent: C, 56.6; H, 4.17.
Calculated for $C_{23}H_{20}O_{12}$: C, 56.6; H, 4.10.

EXAMPLE 28

By using the method described in Example 26, from 0.1 mole (36 g) of 3,11-bis-($\alpha$-furyl)-2,4,10,12-tetraoxadispiro (5,1,5,3)-hexadecane and 0.3 mole (29.4 g) of maleic anhydride there was produced 82% (45.6 g) of 3,11-bis-(2,3-decarboxy-1,4-oxo-5-cyclohexenyl)-2,4,10,12-tetraoxadispiro (5,1,5,3) hexadecane-2,3-dianhydride having a decomposition point of approximately 78°C and an acid number of 400 (calculated, 402).

Found, per cent: C, 64; H, 5.00.
Calculated for $C_{28}H_{28}O_{12}$: C, 60.4; H, 5.03.

EXAMPLE 29

By using the method described in Example 26, from 0.01 mole (3.76 g) of 3,11-bis-(α-furyl)-15-oxy-2,4,10,12-tetraoxadispiro (5,1,5,3) hexadecane there was produced 74% (4.23 g) of 3,11-bis-(2,3-dicarboxy-1,4-oxocyclohexene-5-yl)-15-oxy-2,4,10,12-tetraoxadispiro (5,1,5,3) hexadecane-2,3-dianhydride having a decomposition point of 80°C, and an acid number of 393 (calculated, 393).

Found, per cent: C, 58.4; H, 4.64.
Calculated for $C_{28}H_{28}O_{13}$: C, 58.7; H, 4.89.

EXAMPLE 30

By using the method of Example 26, from 0.01 mole (3.74 g) of 3,11-bis-(α-furyl)-2,4,10,12-tetraoxadispiro (5,1,5,3) hexadecanone-15 there was produced 67% (3.82 g) of 3,11-bis-(2,3-dicarboxy-1,4-oxo-5-cyclohexenyl)-2,4,10,12-tetraoxadispiro (5,1,5,3) hexadecanon-15 with a decomposition point of approximately 85°C. The acid number is 380 (calculated, 393).

Found, per cent: C, 58.8; H, 4.30.
Calculated for $C_{28}H_{26}O_{13}$: C, 58.9; H, 4.54

EXAMPLE 31

5 mmole (2.46 g) of N,N'-bis-phenylfurfurylidene-benzidine and 20 mmoles (1.96 g) of maleic anhydride in 200 ml of tetrahydrofuran was stirred during 6 hours in an inert atmosphere at a boiling point of the solvent. The precipitate was filtered out and extracted by tetrahydrofuran during 48 hours (all the operations are conducted in an inert atmosphere). The yield 79% (2,72 g) of N,H'-bis-(4-phenyl-2,3-dicarboxy-1,4-oxo-5-cyclohexenylmethylene)-benzidine-2,3-dianhydride with a decomposition point of approximately 100°C. The acid number is 317 (calculated, 326).

Found, per cent: C, 71.9; H, 4.22; N, 4.12
Calculated for $C_{42}H_{28}N_2O_8$: C, 73.3; H, 4.07; N, 4.07

EXAMPLE 32

5 mmole (2.08 g) of N,N'-bis-(5-phenylfurfurylidene)-p-phenylenediamine and 20 mmole (1.96 g) of maleic anhydride was treated by the method described in Example 31, thus producing 81% (2.48 g) of N,N'-bis-(4-phenyl-2,3-docarboxy-1,4-oxo-5-cyclohexenylmethylene-p-phenylenediamine-2,3-dianhydride with a decomposition point of approximately 100°C. The acid number is 354 (calculated, 366).

Found, per cent: C, 70.5; H, 3.82; N, 4.71.
Calculated for $C_{36}H_{24}N_2O_8$: C, 77; H, 3.87; N, 4.58.

EXAMPLE 33

2 mmoles (0.724 g) of 1,4-bis-(5-phenyl-2-furyl-benzene and 4 mmoles (0.392 g) of maleic anhydride was treated by the method described in Example 31, thus producing 62% (0.57 g) of 1,4-di-(4-phenyl-2,3-dicarboxy-1,4-oxo-5-cyclohexenyl)-benzene-2,3-dianhydride having a decomposition point of approximately 85°C. The acid number is 392 (calculated, 401).

Found per cent: C, 72.9; H, 4.13.
Calculated for $C_{34}H_{22}O_8$: C, 73.16; H, 3.94.

EXAMPLE 34

By using the method of Example 31, from 2 mmoles (0.876 g) of 4,4'-bis-(5-phenyl-2-furyl)-diphenyl and 4 mmoles (0.392 g) of maleic anhydride there was produced 68% (0.66 g) of 4,4'-bis-(4-phenyl-2,3-dicarboxy-1,4-oxo-5-cyclohexenyl)-diphenyl-2,3-dianhydride having a decomposition point of approximately 90°C. The acid number is 350 (calculated, 354).

Found, per cent: C, 74.2; H, 4.32.
Calculated for $C_{40}H_{26}O_8$: C, 75.7; H, 4.11.

EXAMPLE 35

2 mmoles (0.888 g) of 3,9-bis-(5-phenyl-3-furyl)-2,4,8,10-tetraoxaspiro (5,5) undecane and 2 mmoles (0.196 g) of maleic anhydride in 100 ml of ether was held for 7 days at a temperature of 20°C. The precipitate was washed several times with ether, thus producing 92% of 4,4'-bis-(4-phenyl-2,3-dicarboxy-1,4-oxo-5-cyclohexenyl)-3,3', 5,5'-tetraoxaspiro (5,5) undecane-2,3-dianhydride with a decomposition point of approximately 80°C. The acid number is 348 (calculated, 350).

Found, per cent: C, 65.6; H, 4.40.
Calculated for $C_{35}H_{28}O_{12}$: C, 65.7; H, 4.38.

EXAMPLE 36

By using the method described in Example 31, from 2 mmoles (0.876 g) of 2,2', 5,5'-tetraphenyl-β-difuryl and 4 mmoles (0.392 g) of maleic abhydride there was produced 78% (0.837 g) of 2,2', 5,5'-tetraphenyl-3,3',4,4'-tetracarboxy-1,1'-dicyclohexene-yl-3,3',4,4'-dianhydride having a decomposition point of approximately 100°C. The acid number is 350 (calculated, 354.)

Found, per cent: C, 75.7; H, 4.23.
Calculated for $C_{40}H_{26}O_8$: C, 75.7; H, 4.11.

EXAMPLE 37

1.75 mmole of N,N'-bis-(2,3-dicarboxy-1,4-oxo-5-cycohexenylmethylene)-benzidine-2,3-dianhydride was dissolved in 70 ml of glacial acetic acid and a current of a dry hydrogen bromide free from bromine was passed through the solution. The reaction mixture was slowly heated up to the boiling point and was kept at the boiling temperature during 4–5 hours, thereafter the supply ofhydrogen bromide was ceased and the acetic acid was distilled under the vacuum. The residue was recrystallized from the glacial acetic acid, was reprecipitated from a 10% KOH solution with 10% HCL, washed with water and transferred into dianhydride while heating to 120°C during 6 to 8 hours. The yield of N,N'-bis-(2,3-dicarboxybenzylidene)-benzidine-2,3-dianhydride is 7390. The acid number is 448; calculated, 448.

Found, per cent: C, 71.8; H, 3.24; N, 5.71.
Calculated for $C_{30}H_{16}N_2O_6$: C, 72.0; H, 3.20; N, 5.60.

EXAMPLE 38

0.78 mmole of N,N'-bis(2,3-dicarboxy-1,4-oxo-5-cyclohexylmethylene)-toluidine-2,3-dianhydride was added to a mixture containing 60 ml of glacial acetic acid and 4 drops of concentrated sulphuric acid and the reaction mixture was stirred during 56 hours at a temperature of 20°C. The glacial acetic acid was evaporated, the residue was washed with water and, after treating the product by the method of Example 37, there was produced 80% of N,N'-bis-(2,3-dicarboxybenzylidene)-toluidine-2,3-dianhydride. The acid number: found 427; calculated, 424.

Found in per cent: C, 72.4; H, 3.83; N, 5.18.
Calculated for $C_{32}H_{20}N_2O_6$: C, 72.7; H, 3.79; N, 5.28.

EXAMPLE 39

0.76 mmole of N,N'-bis(2,3-docarboxy-1,4-oxo-5-cyclohexenylmethylene(-diaminodiphenyloxide-2,3-dianhydride was dissolved in 70 ml of polyphosphoric acid (the content of phosphoric anhydride being 74.8%), and the mixture was stirred during 60 hours at 20°C. The reaction mixture was poured into water and the precipitate was treated by the method described in Example 37.

The yield of N,N'-bis-(2,3-dicarboxybenzylidene)-diaminodiphenyloxide-2,3-dianhydride, 56%. The acid number: found 428; calculated, 434.

Found, per cent: C, 70.1; H, 3.27; N, 5.26.

Calculated for $C_{30}H_{16}N_2O_7$: C, 69.9; H, 3.10; N, 5.42.

EXAMPLE 40

10 mmoles of N,N'-bis-(2,3-dicarboxyl-1,4-oxo-5-cyclohexenyl methylene)-p-phenylenediamine-2,3-dianhydride was batched to 250 ml of concentrated sulphuric acid cooled down to -10°C. After completing the batch addition, the mixture was stirred during 1 hour and the solution was poured onto ice. The precipitate was treated by the method of Example 37 to produce 82% of N,N'-bis-(2,3-dicarboxybenzylidene)-p-phenylenediamine-2,3-dianhydride. The acid number: found 530; calculated, 528.

Found, per cent: C, 67.8; H, 2.99; N, 6.73. Calculated for $C_{24}H_{12}N_2O_6$: C, 67.8 ; H, 2.83; N, 6.60.

EXAMPLE 41

2 mmoles (1.24 g) of N,N'-bis-(4-phenyl-2,3-dicarboxy-1,4-oxo-5-cyclohexenylmethylene)-p-phenylenediamine-2,3-dianhydride was dissolved in 170 ml of glacial acetic acid, 21 ml of concentrated hydrochloric acid being added into the reaction mixture, which is then was heated to a temperature of 100°C during 48 hours. The solvent was removed under a vacuum and the product was recrystallizated from acetonitrile. The yield 72% (0.825 g) of N,N'-bis-(4-phenyl-2,3-docarboxybenzylidene)-p-phenylenediamine-2,3-dianhydride. The melting point of the product is higher than 300°C. The acid number is 372 (calculated, 389).

Found, per cent: C, 74.5; H, 3.56; N, 5.12.

Calculated for: $C_{36}H_{20}N_2O_6$: C, 75.0; H, 3.48; N, 4.87.

EXAMPLE 42

2 mmoles (1.37 g) of N,N'-bis-(4-phenyl-2,3-dicarboxy-1,4-oxo-5-cyclohexenylmethylene)-benzidine-2,4-dianhydride was dissolved in 180 ml of glacial acetic acid, 8 drops of concentrated sulphuric acid were added to the reaction mixture and the latter was stirred during 56 hours at 20°C. The product was poured into 0.5 l of water, the precipitate was filtered out, washed with water and was recrystillized from acetonitrile. There was produced 64% (0.855 g) of N,N'-bis(4-phenyl-2,3-dicarboxylbenzylidene)-benzidine-2,3-dianhydride, having a melting point higher than 300°C. The acid number is 342 (calculated, 348).

Found, per cent: C, 77.0; H, 3.52; N, 4.47.

Calculated for $C_{42}H_{26}N_2O_6$: C, 77.2; H, 3.73; N, 4.35.

EXAMPLE 43

5 mmoles (2.03 g) of 1,4-di(2,3-dicarboxy-1,4-oxo-5-cyclohexenyl(-benzene-2,3-dianhydride and 42 ml of concentrated hydrochloric acid in 345 ml of glacial acetic acid was heated to a temperature of 100°C during 48 hours. The solvent was removed under a vacuum and the product was subjected to chromotography over neutral aluminium oxide in tetrahydrofuran, thus producing 62% (1.17 g) of dianhydride of p-terphenyl-2,2'',3,3''-tetracarboxylic acid having a melting point exceeding 300°C. The acid number: found 584; calculated, 605.

Found, per cent: C, 70.62; H, 3.03

Calculated for $C_{22}H_{10}O_6$: C, 71.4; H, 2.71

EXAMPLE 44

5 mmoles (2.03 g) of 1,4-(2,3-dicarboxyl-1,4-oxo-5-cyclohexenyl(-benzene-2,3-dianhydride in 167 ml of glacial acetic acid in the presence of 2 drops of concentrated sulphuric acid was stirred during 24 hours at 20°C. The solution was precipitated in ether and the product was subjected to chromotography over neutral aluminium oxide in tetrahydrofuran, thus producing 74% (1.36 g) of dianhydride of p-terphenyl-2,2''',3,3''-tetracarboxylic acid.

EXAMPLE 45

2 mmoles (0.812 g) of 1,4-di(2,3-dicarboxy-1,4-oxo-5-cyclohexenyl(bemzene-2,3-dianhydride in 75 ml of 116% polyphosphoric acid was stirred during 5 days at a temperature of 40°-50°C. The solution was precipitated into water, the precipitate was filtered out, dissolved in 5% KOH, filtered out again and precipitated in 5% hydrochloric acid. After heating the reaction mixture during 4 hiurs at 100°C in acetic anhydride, there was produced 0.41 g(56%) of dianhydride of p-terphenyl-2,2'',3,3''-tetracarboxylic acid.

EXAMPLE 46

2 mmoles (0.944 g) of 4,4'-di(2,3-dicarboxy-1,4-oxo-5-cyclohexenyl)diphenyl-2,3-dianhydride was treated by the method described in Example 40, thus producing 47% (0.42 g) of dianhydride of p-quarterphenyl-2,2''',3,3''' -tetracarboxylic acid having a melting point exceeding 300°C. The acid number: found 492; calculated, 503.

Found, per cent: C, 75.0; H, 3.51.

Calculated for $C_{28}H_{14}O_6$ : C, 75.3; H, 3.14.

EXAMPLE 47

2 mmoles (0.944 g) of 4,4'-di(2,3-dicarboxy-1,4-oxo-5-cyclohexenyl)-diphenyl-2,3dianhydride was treated by the method of Example 37 for producing 53% (0.47 g) of dianhydride of p-quarterphenyl-2,2''', 3,3'''-tetracarboxylic acid.

EXAMPLE 48

2 mmoles (0.944 g) of 4,4'-di(2,3-dicarboxy-1,4-5-oxocyclohexenyl)diphenyl-2,3-dianhydride was treated by the method described in Example 38 for producing 67% (0.696ª) of dianhydride of p-quarterphenyl-2,2'''-3,3'''-tetracarboxylic acid.

EXAMPLE 49

5 mmoles (2.79 g) of 1,4-di-(4-phenyl-2,3-dicarboxy-1,4-oxo-5-cyclohexenyl)-benzene-2,3-dianhydride was dissolved in 400 ml of glacial acetic acid and HBr was passed through the reaction mixture during 12 hours at 100°C. The solvent was removed under a vacuum and the product was recrystallized from acetylacetone. There was produced 78% (2.04 g) of dianhydride of 4,4''-diphenyl-p-terphenyl-2,2'',3,3''-tetracarboxylic acid having a melting point exceeding 300°C and an acid number 432 (calculated, 429).

Found, per cent: C, 77.8; H, 3.58.
Calculated for $C_{34}H18O_6$: C, 78.2; % H, 3.45.

EXAMPLE 50

2 mmoles (1.268 g) of 4,4'-di-(4-phenyl-2,3-dicarboxy-1,4-oxo-5-cyclohexenyl)diphenyl-2,3-dianhydride in 40 ml of 116% polyphosphoric acid was stirred during 5 days at 20°C. The solution was poured into water, the precipitate was filtered out, washed with water and recrystallizated from acetylacetone. This resulted in production of 51% (0.603 g) of dianhydride of 4,4$^{111}$-diphenyl-p-quarterphenyl-2,2$^{111}$, 3,3$^{111}$- tetracarboxylic acid having a melting point higher than 300°C and an acid number of 384 (calculated, 375).
Found, per cent: C, 79.2; H, 3.82.
Calculated for $C_{40}H_{22}O_6$: C, 80.3; H, 3.68.

EXAMPLE 51

2 mmoles (0.96 g) of 3,9-bis-(2,3-dicarboxy-1,4-oxo-5-cyclohexenyl(-2,4,8,10-tetraoxaspiro (5,5) undecane-2,3dianhydride in 100 ml of glacial acetic acid was treated by dry hydrogen chloride at 100°C during 16 hours. The solution was precipitated into ether and the product was recrystallized from methanol with activated charcoal. This resulted in production of 51% (0.454 g) of 3,9-bis-(2,3-dicarboxyphenyl)-2,4,8,10-tetraoxaspiro (5,5) undecane-2,3-dianydride having a melting point of 284°–286°C. The acid number is 490 (calculated, 495).
Found, per cent: C, 61.3; H, 3.51.
Calculated for $C_{23}H_{16}O_{10}$: C, 61.0; H, 3.40.

EXAMPLE 52

2 mmoles (1.12g) of 3,11-bis-(2,3-dicarboxy-1,4-oxo-5-cyclohexenyl)-2,4,10,12-tetraoxadispiro (5,1,5,3) hexadecane-2,3-dianhydride was heated in 75 ml of 116% polyphosphoric acid during 4 days at 20°C. The precipitate was poured into water, the precipitate was washed and, after recrystallization from ethanol, there was produced 42% (0.438 g) 3,11-bis-(2,3-dicarboxyphenyl)-2,4,10,12-tetraoxaspiro(5,1,5,3) hexadecane-2,3-dianhydride having a melting point of 261°–262°C and an acid number of 430 (calculated, 430).
Found, per cent: C,64.42; H, 4.74.
Calculated for $C_{28}H_{24}O_{10}$: C, 64.6; H, 4.63

EXAMPLE 53

Added to 2 mmoles (1.28 g) of 3,9-bis-(4-phenyl-2,3-dicarboxy-1,4-oxo-5-cyclohexenyl)2,4,8,10-tetraoxaspiro (5,5) undecane-2,3-dianhydride in 100 ml of glacial acetic acid was 4 drops of concentrated sulphuric acid, the reaction mixture was held during 7 days at 20°C, the solvent was removed under a vacuum and the product was recrystallized from acetone. This resulted in production of 71.8% (0.86 g) of 3,9-bis-(4-phenyl-2,3-dicarboxyphenyl)-2,4,8,10-tetraoxaspiro (5,5) undecane-2,3-dianhydride having a melting point of 212°C and an acid number of 370 (calculated, 372)
Found, per cent: C, 69.2; H, 4.13
Calculated for $C_{35}H_{24}O_{10}$ : C, 69.6; H, 3.98.

EXAMPLE 54

2 mmoles (1.04 g) of di-(2,3-dicarboxy-1,4-oxo-5-cyclohexenyl terephthalate 2,3-dianhydride in 170 ml of glacial acetic acid was treated with a flow of dry hydrochloric acid at 100°C during 12 hours. The solvent was removed under a vacuum, the product was recrystallized from ethylacetate, thereby producing 72% (0.7 g) of di-(2,3-dicarboxyphenyl terephthalate) 2,3-dianhydride. The melting point of the product is 216°–217°C, the acid number is 457 (calculated, 460).
Found, per cent: C, 64.2; H, 3.18
Calculated for $C_{26}H_{14}O_{10}$: C, 64.1; H, 2.98.

EXAMPLE 55

Added to 2 mmoles (1.04 g) of di-(2,3-dicarboxy-1,4-oxo-5-cyclohexenyl-terephthalate-2,3-dianhydride in 130 ml of glacial acetic acid were 4 drops of concentrated sulphuric acid, and the reaction mixture was stirred 62 hours at 20°C. The product was precipitated into water, washed on a filter and, after the recrystallization from ethylacetate, 80% (0.778 g) of di-2,3-dicarboxyphenyl terephthalate-2,3-dianhydride was produced.

EXAMPLE 56

2 mmoles (1.04 g) of di-(2,3-dicarboxy-1,4-oxo-5-cyclo-) isophthalate-hexanyl-2,3-dianhydride in 40 ml of polyphosphoric acid was stirred during 72 hours at 30–40°C. The product was precipitated into water, washed with water to a neutral reaction and was recrystallized from ethylacetate. This resulted in production of 54% (0.525 g) of di-(2,3-dicarboxyphenyl isophthalate)-2,3-dianhydride having a melting point of 187°–189°C and an acid number of 446 (calculated, 460).
Found, per cent: C, 63.84; H, 3.12.
Calculated for $C_{26}H_{14}O_{10}$: C, 64.1; 2.98

EXAMPLE 57

2 mmoles(1.04 g) of di-(2,3-dicarboxy-1,4-oxo-5-cyclohexenyl isophthalate)-2,3-dianhydride was treated by the method of Example 40 and there was produced 76% (0.738 g) of di-(2,3-dicarboxylphenyl isophthalate)-2,3 dianhydride.

EXAMPLE 58

1.68 mmole (1 g) of di-(2,3-dicarboxyl-1,4-oxo-5-cyclohexenyl 4,4'-diphenyldicarboxylate)-2,3-dianhydride was treated by the method of Example 38, thus producing 68% (0.638) of di-(2,3-dicarboxyphenyl- 4,4'-diphenyldicarboxylate)-2,3-dianhydride having a melting point of 218°–219°C and an acid number of 392 (calculated, 399).
Found, per cent: C, 68.3; H, 3.40.
Calculated for $C_{32}H_{18}O_{10}$: C, 68.3; H, 3.21.

EXAMPLE 59

2 mmoles (1.268 g) of 2,2',5,5'-tetraphenyl-3,3',4,4'-tetracarboxy-1,1'-dicyclohexene-1y1 -3,3'-4,4'-dianhydride was treated by the method of Example 37 and, after the recrystallization, there was produced 51% (0.603 g) of dianhydride of 2,2',5,5'-tetraphenyl-diphenyl-3,3',4,4'-tetracarboxylic acid having a melting point 284°–286°C and an acid number of 362 (calculated, 375).
Found, per cent: C, 80.15; H, 3.84.
Calculated for $C_{40}H_{22}O_6$: C, 80.3; H, 3.68.

We claim:
1. A dianhydride of aromatic tetracarboxylic acids, of the formula:

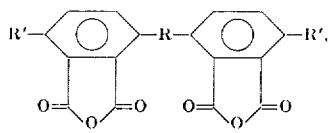

where R is
  a. arylene selected from the group consisting of p-phenylene, m-phenylene, 4,4'-diphenylene, 3,3'-dimethyl-4,4'-diphenylene, 4,4'-diphenylenoxide, 4,4'-diphenylene, -diphenylenoxide, 4,4'-diphenylene-methane, and 4,4-diphenylenesulphone;
  b. a group —CH=N—R''—N=CH—, where R'' is arylene selected from the group consisting of p-phenylene, m-phenylene, 4,4'-diphenylene, 3,3'-diphenylene,3,3'-dimethyl-4,4'-diphenylene,3,3'-dimethoxy-4,4'-diphenylene, 4,4'-diphenylenoxide, 4,4'-diphenylenemethane, 4,4'-diphenylenesulphone, 4,4'-diphenylenesulphide, 1,4-napthylene, 1,5-naphthylene, 2,6-naphthylene, 2,7-naphthylene, and 1,4-anthrylene;
  c. a group

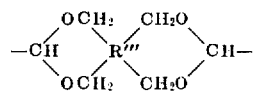

where R''' is selected from the group consisting of

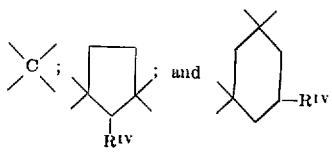

where $R^{IV}$ is selected from the group consisting of H, OH, and =O; or
  d. a group $-CH_2 OCO-R^V-COOCH_2-$, where $R^V$ is selected from the group consisting of p-phenylene, m-phenylene, 4,4'-diphenylene, 1,4-naphthylene, 1,5-naphthylene, 2,6-naphthylene, and 2,7-naphthylene; and
R' is selected from the group consisting of hydrogen, phenyl, and naphthyl with the proviso that when R is p1phenylene or m-phenylene, R' is selected from the group p-phenylene of phenyl and naphthyl.

2. A dianhydride of the formula:

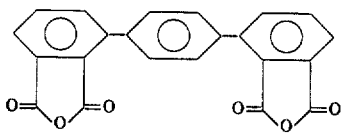

3. A dianhydride of the formula:

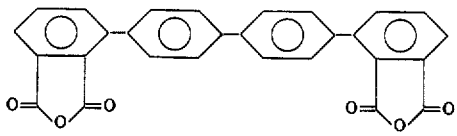

4. A dianhydride of the formula:

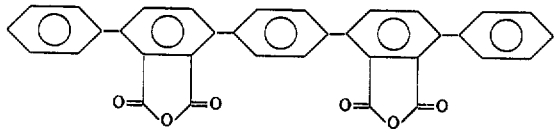

5. A dianhydride of the formula:

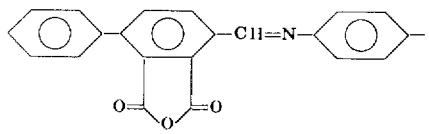

6. A dianhydride of the formula:

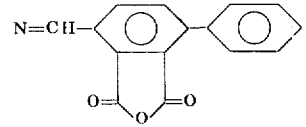

7. A dianhydride of the formula:

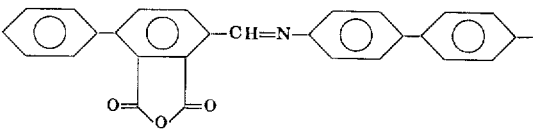

8. A dianhydride of the formula:

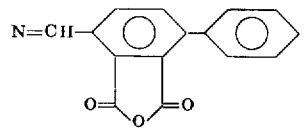

9. A dianhydride of the formula:

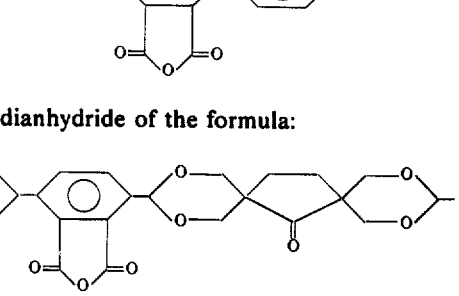

10. A dianhydride of the formula:

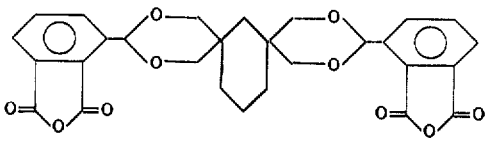

11. A dianhydride of the formula:
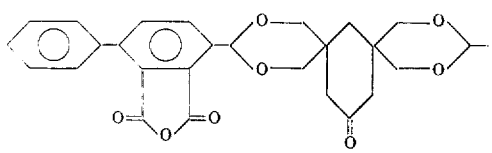
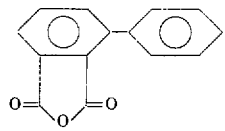
12. A dianhydride of the formula:
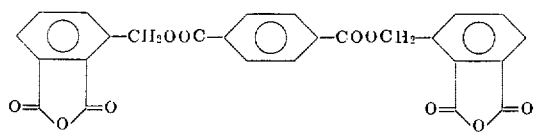
13. A dianhydride of the formula:
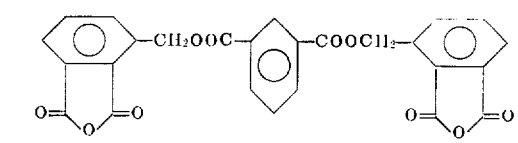
14. A dianhydride of the formula:
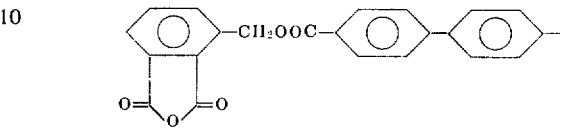
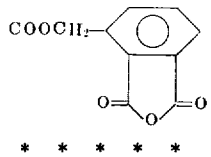
\* \* \* \* \*